(12) United States Patent
Choi et al.

(10) Patent No.: US 11,042,223 B2
(45) Date of Patent: Jun. 22, 2021

(54) ELECTRONIC DEVICE FOR RECOGNIZING USER'S GESTURE

(71) Applicant: Samsung Electronics Co., Ltd., Gyeonggi-do (KR)

(72) Inventors: Seunghwan Choi, Gyeonggi-do (KR); Hyunjin Kim, Gyeonggi-do (KR); Jaeyoung Lee, Gyeonggi-do (KR); Say Jang, Gyeonggi-do (KR); Sangwoong Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/962,272

(22) PCT Filed: Jan. 31, 2019

(86) PCT No.: PCT/KR2019/001380
§ 371 (c)(1),
(2) Date: Jul. 15, 2020

(87) PCT Pub. No.: WO2019/151805
PCT Pub. Date: Aug. 8, 2019

(65) Prior Publication Data
US 2021/0064148 A1    Mar. 4, 2021

(30) Foreign Application Priority Data
Feb. 1, 2018    (KR) ........................ 10-2018-0012654

(51) Int. Cl.
*H04N 5/232*    (2006.01)
*G06F 3/01*    (2006.01)
(Continued)

(52) U.S. Cl.
CPC .............. *G06F 3/017* (2013.01); *G06F 3/165* (2013.01); *G06K 9/00355* (2013.01);
(Continued)

(58) Field of Classification Search
None
See application file for complete search history.

(56) References Cited

U.S. PATENT DOCUMENTS 7,460,687 B2    12/2008 Yokoyama
9,558,555 B2    1/2017 Holz
(Continued)

FOREIGN PATENT DOCUMENTS

KR    10-2013-0051319 A    5/2013
KR    10-2014-0055172 A    5/2014
(Continued)

*Primary Examiner* — Eileen M Adams
(74) *Attorney, Agent, or Firm* — Cha & Reiter, LLC.

(57) ABSTRACT

According to an embodiment disclosed in the present document, a gesture-based command execution method may comprise the operations of: acquiring a command from a user by using a sensor; in response to acquisition of the command, controlling an actuator so that the user can be included in a FoV of a camera module, and thus changing a capturing direction of the camera module; acquiring first gesture information on the user's moving gesture through the camera module at a first time point and a second time point; at the second time point, controlling the actuator so that the FoV can be changed, on the basis of a direction determined by the first gesture information; acquiring space information corresponding to the changed FoV through the camera module; controlling the actuator so that the user can be included in a FoV of the camera module, at a third time point after the second time point; acquiring second gesture information on the user's moving gesture through the camera module after the third time point; and when all the pieces of gesture information are acquired as an input, executing the command on the basis of a designated area determined by the acquired gesture information and the acquired space information.

15 Claims, 11 Drawing Sheets

(51) Int. Cl.
 *G06K 9/00* (2006.01)
 *G06F 3/16* (2006.01)
 *H04R 1/02* (2006.01)
 *G10L 15/22* (2006.01)

(52) U.S. Cl.
 CPC ......... *G10L 15/22* (2013.01); *H04N 5/23203* (2013.01); *H04N 5/23299* (2018.08); *H04R 1/028* (2013.01); *G10L 2015/223* (2013.01)

(56) References Cited

U.S. PATENT DOCUMENTS

| | | |
|---|---|---|
| 9,597,804 B2 | 3/2017 | Yoon et al. |
| 9,762,792 B2 | 9/2017 | Holz |
| 9,986,153 B2 | 5/2018 | Holz |
| 10,265,858 B2 | 4/2019 | Yoon et al. |
| 10,348,959 B2 | 7/2019 | Holz |
| 10,638,036 B2 | 4/2020 | Holz |
| 2004/0101192 A1 | 5/2004 | Yokoyama |
| 2015/0032260 A1 | 1/2015 | Yoon et al. |
| 2015/0241981 A1 | 8/2015 | Kim |
| 2015/0262002 A1 | 9/2015 | Matsunaga |
| 2015/0262428 A1* | 9/2015 | Tatzgern ................. G06T 11/00 345/633 |
| 2017/0104924 A1* | 4/2017 | Holz ......................... G06T 7/50 |
| 2017/0144311 A1 | 5/2017 | Yoon et al. |

FOREIGN PATENT DOCUMENTS

| | | |
|---|---|---|
| KR | 10-1526425 B1 | 6/2015 |
| KR | 10-2015-0107597 A | 9/2015 |
| KR | 10-2017-0008064 A | 1/2017 |

\* cited by examiner

ELECTRONIC DEVICE FOR RECOGNIZING USER'S GESTURE

CROSS REFERENCE TO RELATED APPLICATIONS

This application is a National Phase Entry of PCT International Application No. PCT/KR2019/001380, which was filed on Jan. 31, 2019, and claims a priority to Korean Patent Application No. 10-2018-0012654, which was filed on Feb. 1, 2018, the contents of which are incorporated herein by reference.

TECHNICAL FIELD

Embodiments disclosed in this specification relate to an electronic device that recognizes a user's gesture.

BACKGROUND ART

With the development of technology, various types of electronic devices have been developed. In particular, electronic devices such as robots capable of performing various functions are released in a wide range of fields. The robots have been mainly limited to industrial robots in the past. However, nowadays, the use and application fields of robots, such as public places, home, or the like, are gradually expanding.

Nowadays, as the level of technology such as speech recognition, artificial intelligence, or the like increases, robots capable of communicating with users and performing operations depending on various commands of users are being developed. For example, the robots may recognize a user's voice or action and may provide the user with specified information or necessary functions based on the recognized voice or action.

DISCLOSURE

Technical Problem

An electronic device such as a robot may include a camera module capable of recognizing a user's action or gesture. However, the field of view (FoV) of the camera module mounted on the robot may be limited, and thus the FoV at which the electronic device may recognize the user's action or gesture while the electronic device is stopped may be limited.

When the user notify the electronic device that the user points to the specified region, it may be difficult for the electronic device to recognize the indicated region in response to the user's action immediately due to the limited FoV.

Furthermore, when the region recognized by the electronic device is different from the region intended by the user, the electronic device may request the user to enter a new input again. Because the user needs to repeat the indication operation late, the user's convenience may deteriorate.

Embodiments disclosed in this specification are intended to provide the electronic device for solving the above-described problem and problems brought up in this specification.

Technical Solution

According to an embodiment disclosed in this specification, an electronic device may include at least one sensor, a camera module having a field of view (FoV) in a specified range, an actuator configured to change a shooting direction of the camera module, and a processor electrically connected to the at least one sensor, the camera module, and the actuator. The processor may be configured to obtain a command from a user, using the at least one sensor, to control the actuator in response to obtaining the command such that the user is included in the FOV of the camera module, to change the shooting direction of the camera module, to obtain gesture information about a moving gesture of the user as an input through the camera module, and to perform the command based on a specified region determined by the obtained space information and the obtained gesture information when all the gesture information is obtained as an input. While obtaining the gesture information, the processor may be configured to obtain first gesture information of the gesture information from the camera module, from a first time point to a second time point, to control the actuator such that the FoV is changed based on a direction determined by the obtained first gesture information, at the second time point, to obtain space information corresponding to the changed FOV through the camera module, to control the actuator such that the user is included in the FoV of the camera module, at a third time point after the second time point, and to obtain second gesture information of the gesture information from the camera module, after the third time point.

According to another embodiment disclosed in this specification, a gesture-based command performing method of an electronic device may include obtaining a command from a user, using a sensor, controlling an actuator in response to obtaining the command such that the user is included in a FOV of a camera module, to change the shooting direction of the camera module, obtaining first gesture information about a moving gesture of the user through the camera module, from a first time point to a second time point, controlling the actuator such that the FoV is changed based on a direction determined by the first gesture information, at the second time point, obtaining space information corresponding to the changed FOV through the camera module, controlling the actuator such that the user is included in the FoV of the camera module, at a third time point after the second time point, obtaining second gesture information about the moving gesture of the user through the camera module, after the third time point, and performing the command based on a specified region determined by the obtained space information and the obtained gesture information when all the gesture information is obtained as an input.

Advantageous Effects

According to embodiments disclosed in this specification, even when a user points to a region out of the FoV of an electronic device, an electronic device may recognize the indicated region in response to the operation indicated by the user directly. Besides, it is possible to allow the electronic device to increase the accuracy of recognition for the user's command, by providing the user with information about a specified region corresponding to the user's gesture in real time. In this way, the user's convenience may be increased. Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Figure 1:
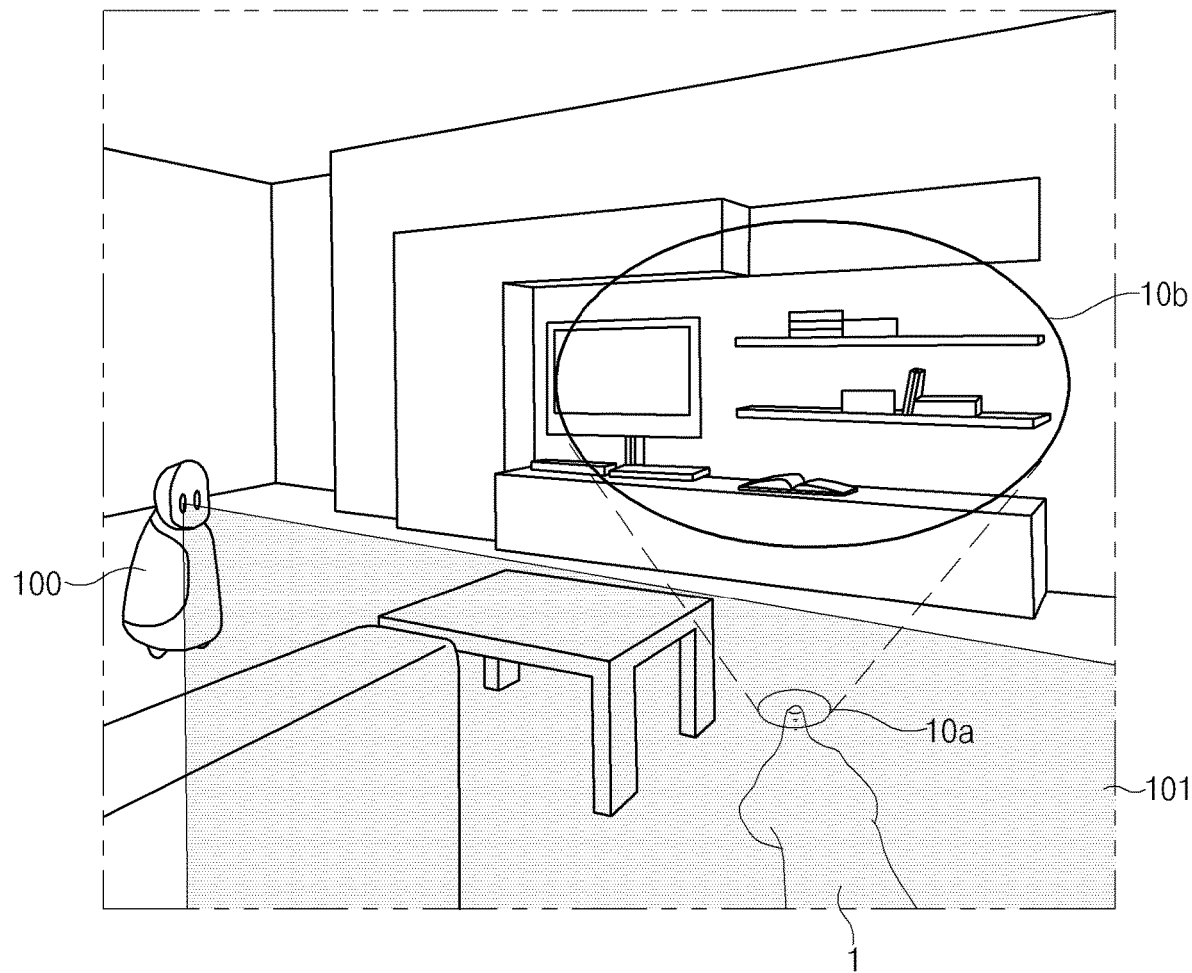
FIG. 1 illustrates an electronic device recognizing a user's gesture, according to an embodiment.

FIG. 1 illustrates an electronic device recognizing a user's gesture, according to an embodiment.

Referring to FIG. 1, an electronic device 100 may include a camera module, and the camera module may have a FoV 101 of a limited range. In this specification, the FoV 101 of the camera module may be understood to be the same as the FoV 101 of the electronic device 100.

According to an embodiment, the electronic device 100 may obtain a voice command of a user 1 or a command by a gesture 10a. According to an embodiment, the voice command may include a specified voice. For example, the voice command may include a specified voice such as "Bixby", "Hi! Bixby", "Goodbye Bixby", or the like. In an embodiment, the specified voice may execute the speech recognition function of the electronic device 100.

According to an embodiment, the electronic device 100 may be configured to watch the user 1 in response to the input of the specified voice. For example, the FoV 101 of the electronic device 100 may be changed in a direction in which the voice is input. According to another embodiment, the electronic device 100 may be configured to provide the user with a specified response when the specified voice is input. For example, a voice for requesting the user 1 to enter an additional input may be provided to the electronic device 100 in response to the input of the specified voice.

According to an embodiment, the FoV 101 of the camera module has a limited range, and thus the FoV 101 of the camera module does not include the user 1 at the time of obtaining a voice command of the user 1. In this case, the electronic device 100 may change the shooting direction of the camera module in response to the acquisition of the voice command such that the user 1 is included in the FoV 101 of the camera module.

According to an embodiment, the electronic device 100 may recognize a gesture 10a of the user 1 and may obtain the direction of the specified body part of the user 1, for example, the hand of the user 1, as the input to the specified command. According to an embodiment, the direction indicated by the hand of the user 1 may be estimated by various algorithms. For example, the electronic device 100 may estimate the direction as a direction formed by connecting and extending at least two locations of the body of the user 1, such as a head, shoulders, hands, or fingertips of the user 1.

According to an embodiment, the gesture 10a of the user 1 may be a moving gesture. For example, when the user 1 sets the specified region 10b in the specified direction, the user 1 may repeat the gesture 10a for drawing a substantial circle or polygon by hand.

In an embodiment, the electronic device 100 may obtain gesture information at a specified time interval. In an embodiment, as the specified time point interval decreases, the gesture information about the user's gesture may be obtained more detailed.

For example, the gesture information may include the coordinates of a specified body part of the user 1, for example, a hand. For another example, the gesture information may include a direction vector of the gesture 10a. As described above, the direction vector may be estimated by various algorithms.

According to an embodiment, the FoV 101 of the camera module may have a limited range, and thus the FoV 101 of the camera module may not include a region 10b indicated by the user 1 at a point in time when the electronic device 100 recognizes the gesture 10a of the user 1. In this case, to obtain space information about the region 10b indicated by the user 1, the electronic device 100 may change the FoV 101 based on the direction determined by the gesture 10a of the user 1. For example, the electronic device 100 may obtain a part of the gesture information during a specified time. A part of the obtained gesture information may include a direction vector of the gesture 10a; the electronic device 100 may change the FoV 101 in a direction corresponding to the direction vector.

According to an embodiment, the electronic device 100 may obtain space information corresponding to the changed FoV 101. For example, the electronic device 100 may obtain image information corresponding to the changed FoV 101 through a camera module. For example, the image information may include structures, shapes, distances, or a type or size of the positioned object with respect to the region indicated by the user 1.

According to an embodiment, the electronic device 100 may obtain information about the specified region 10b that the user 1 wants to indicate, based on a part of the obtained space information and previously-obtained gesture information. For example, the electronic device 100 may obtain information of a target to be indicated by the user 1 or space coordinates of a point to be indicated, based on the space information and the part of gesture information.

According to an embodiment, the electronic device 100 may change the FoV 101 again to obtain the rest other than the part of the gesture information. When the electronic device 100 changes the FoV 101 again to obtain the rest of the gesture information, the electronic device 100 may obtain information about the specified region 10b indicated by the user 1 based on the previously-obtained space information and gesture information.

According to an embodiment, when the electronic device 100 obtains information about the specified region 10b, the electronic device 100 may perform various operations based on the specified region 10b. For example, an operation of organizing objects in the specified region 10b may be performed based on the voice command of the user 1. In this case, the electronic device 100 may obtain information about objects in the specified region 10b, and may perform the operation on the objects that satisfy a specified condition based on the obtained information. For example, the electronic device 100 may perform the operation on only the object, of which the size is smaller than a specified size.

According to an embodiment, gesture information not obtained while the electronic device 100 changes the FoV 101 such that the electronic device 100 obtains space information may be estimated in various ways. For example, the electronic device 100 may estimate the gesture information based on a part of the gesture information obtained before the space information is obtained and another part of the gesture information obtained after the space information is obtained. For another example, the electronic device 100 may estimate the gesture information from a part of gesture information obtained before the space information is obtained.

According to an embodiment, the electronic device 100 may obtain information about the specified region 10b indicated by the user 1, based on the obtained space information and the obtained or estimated gesture information. According to an embodiment, the electronic device 100 may play a feedback sound source based on the obtained space information and the obtained or estimated gesture information. For example, the electronic device 100 may distinguish information about a point indicated by the current user 1 as a specified sound source based on the obtained space information and the currently-obtained gesture information to provide the information to the user 1 in real time. In this way, the user 1 may determine the sameness between the point recognized by the electronic device 100 and the point intended by the user 1.

Figure 2:
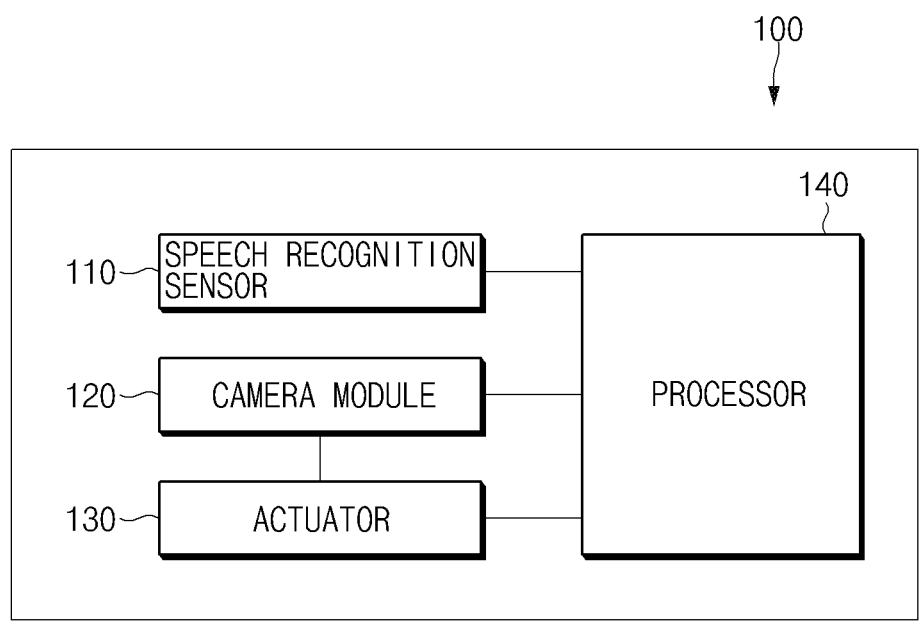
FIG. 2 is a block diagram of an electronic device recognizing a user's gesture according to an embodiment.

FIG. 2 is a block diagram of an electronic device recognizing a user's gesture according to an embodiment.

Referring to FIG. 2, the electronic device 100 may include a speech recognition sensor 110, a camera module (alternatively, a camera or a camera including a circuit) 120, an actuator 130, and a processor 140. According to various embodiments, the electronic device 100 may further include a component not illustrated in FIG. 2 or may not include a part of the components illustrated in FIG. 2. For example, the electronic device 100 may further include a memory to store space information or gesture information obtained through the camera module 120. For another example, the electronic device 100 may further include a speaker for playing a feedback sound source.

The speech recognition sensor 110 may be a sensor for obtaining a voice command of a user (e.g., the user 1 of FIG. 1) as an input. For example, the speech recognition sensor 110 may include a microphone. According to an embodiment, the speech recognition sensor 110 may include a plurality of filters to distinguish a user's voice. Through the plurality of filters, the speech recognition sensor 110 may detect only the meaningful voice command of the user and may transmit the meaningful voice command to the processor 140.

The camera module 120 may obtain image data corresponding to the FoV of the electronic device 100. According to an embodiment, the camera module 120 may have the FoV (e.g., the FoV 101 of FIG. 1) of the limited range. As the range of the FoV is limited, the image capable of being obtained by the camera module 120 at a specified time point may be limited to the specified range. For example, the image data obtained by the camera module 120 at the specified time point may not include at least one of a user and a target indicated by the user.

According to an embodiment, the plurality of camera modules 120 may be present. In an embodiment, the plurality of camera modules 120 may have different FoVs, respectively. For example, the FoV of the first camera module may include the user and may not include the target indicated by the user; the FoV of the second camera module may include the target indicated by the user and may not include the user. In this case, the electronic device 100 may alternately obtain the gesture information of the user and space information of the region indicated by the user by selectively activating the plurality of camera modules 120.

According to an embodiment, the camera may be a 3D camera. The 3D camera may be the camera module 120 that obtains image data including depth information.

The actuator 130 may be electrically connected to the camera module 120, and may change the shooting direction of the camera module 120. For example, the actuator 130 may change the shooting direction of the camera module 120 such that the user is included in the FoV of the camera module 120. For another example, the actuator 130 may change the shooting direction of the camera module 120 such that the FoV of the camera module 120 includes the region indicated by the user.

The processor 140 may be electrically connected to the speech recognition sensor 110, the camera module 120, and the actuator 130 and may be configured to control the operations of the configurations. For example, the processor 140 may control the operation of the actuator 130 to change the shooting direction of the camera module 120.

According to an embodiment, the processor 140 may process information obtained by the electronic device 100. For example, the processor 140 may determine whether a specified voice for performing a specified command is included from a voice signal obtained by the speech recognition sensor 110. For another example, the processor 140 may obtain gesture information of a user and space information of a region indicated by the user, from the image data obtained by the camera module 120. The processor 140 may estimate a specified region indicated by the user based on the obtained gesture information and space information. For another example, the processor 140 may estimate another part of gesture information through a part of gesture information obtained through the camera module 120.

According to various embodiments, the description of each configuration of the above-mentioned electronic device is only an embodiment and is not limited thereto. In addition, in this specification, the same contents as described in FIG. 2 may be applied to the components having the same reference numerals as the electronic device 100 shown in FIG. 2.

Figure 3:
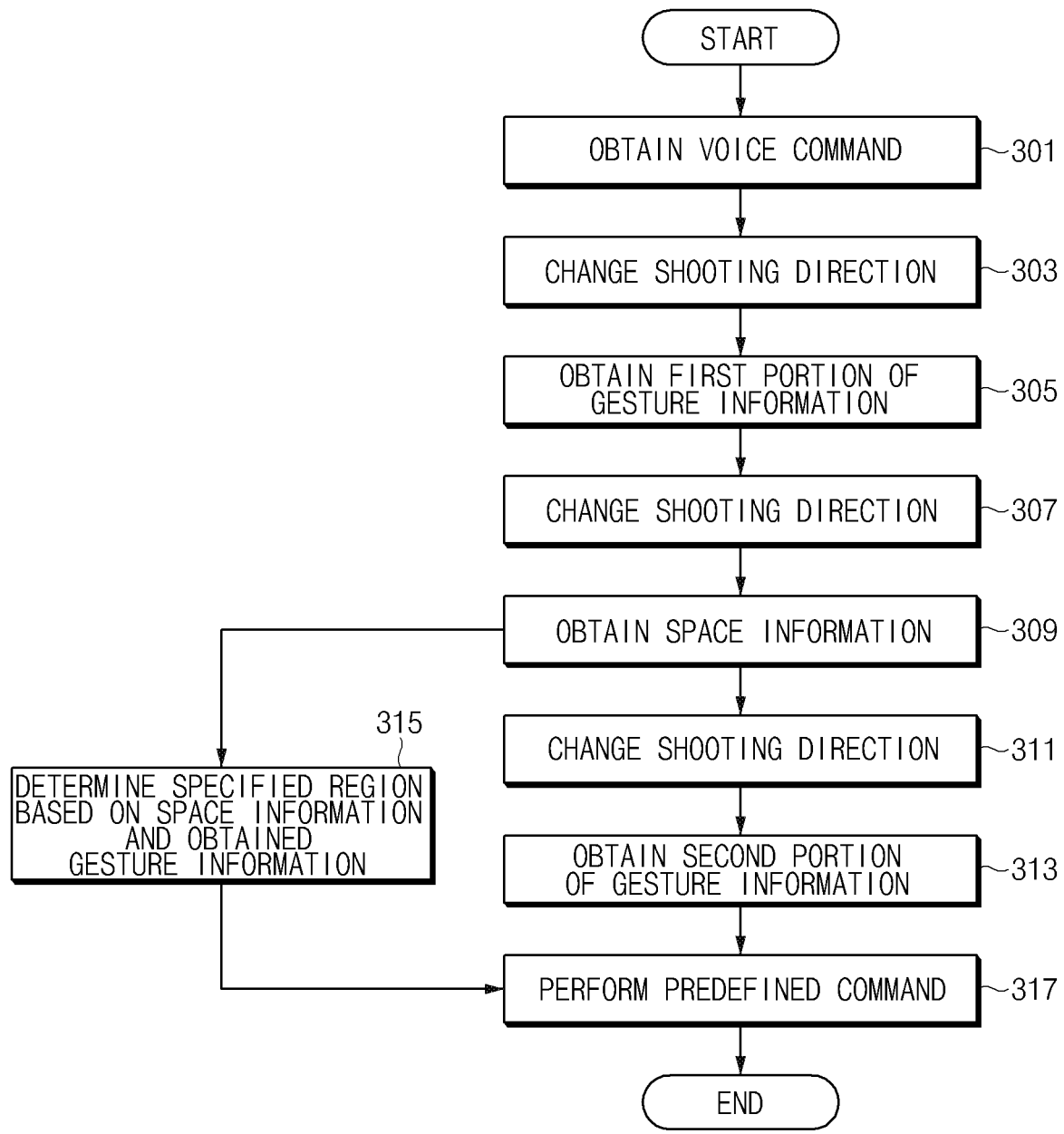
FIG. 3 is a flowchart, in which an electronic device recognizes a user's gesture and performs a predefined command, according to an embodiment.

FIG. 3 is a flowchart, in which an electronic device recognizes a user's gesture and performs a predefined command, according to an embodiment.

Referring to FIG. 3, an operation in which an electronic device (e.g., the electronic device 100 of FIGS. 1 and 2) according to an embodiment recognizes a gesture (e.g., the gesture 10a of FIG. 1) of a user (e.g., the user 1 of FIG. 1) and performs a predefined command may include operation 301 to operation 317.

In operation 301, the electronic device 100 may obtain a voice command from the user. According to an embodiment, the voice command may include a specified voice. In an embodiment, when the voice command includes the specified voice, the electronic device 100 may determine that the voice command is a meaningful input; when the voice command does not include the specified voice, the electronic device may ignore the voice command.

In operation 303, the electronic device 100 may change the shooting direction of the camera module in response to the acquisition of the voice command such that the user is included in the FoV of the camera module (e.g., the camera module 120 in FIG. 2). In an embodiment, the shooting direction may be controlled by an actuator.

According to an embodiment, before performing the operation 303, the electronic device 100 may perform an operation of determining whether the user is included in the FoV of the camera module 120. In this case, when the user is included in the FoV of the camera module 120, operation 303 may be omitted.

In operation 305, the electronic device 100 may obtain a first portion of a user's gesture information from a first time point to a second time point. The first portion of the gesture information may be referred to as first gesture information. In an embodiment, the gesture information may include coordinates of a user's body part and a direction vector of a gesture. The electronic device may determine the direction indicated by the user through the first gesture information.

In operation 307, the electronic device 100 may change the shooting direction of the camera module 120 based on the direction determined through the first gesture information. For example, the electronic device may control the actuator such that the FoV of the camera module 120 is changed at the second time point.

In operation 309, the electronic device 100 may obtain space information corresponding to the changed FoV. The space information may include a specified location corresponding to the first gesture information.

In operation 311, the electronic device 100 may change the shooting direction of the camera module 120 again such that the user is included in the FoV of the camera module 120 at a third time point after the second time point. For example, the electronic device may control the actuator such that the FoV of the camera module 120 is changed.

In operation 313, the electronic device 100 may obtain gesture information after the third time point, for example, the second portion of the gesture information through the camera module 120. The second portion may be referred to as second gesture information.

For example, coordinates of a body part may be estimated between the second time point and the third time point based on the coordinates of the body part included in the first gesture information at the second time point and the coordinates of the body part included in the second gesture information at the third time point.

In operation 315, the electronic device 100 may determine the specified region (e.g., the specified region 10b of FIG. 1) indicated by the user based on the space information and the obtained gesture information. In an embodiment, when determining the specified region, the electronic device 100 may estimate gesture information between the second time point and the third time point. For example, the electronic device 100 may estimate coordinates of a body part between the second time point and the third time point based on the coordinates of the body part included in the first gesture information at the second time point and the coordinates of the body part included in the second gesture information at the third time point.

According to an embodiment, the operation of determining the specified region may be performed from obtaining space information in operation 309 to a point in time when the second gesture information is obtained in operation 313. According to an embodiment, the operation 315 may be performed simultaneously with operation 309 to operation 313.

In operation 317, the electronic device 100 may perform a predefined command based on the specified region determined in operation 315. In an embodiment, the predefined command may be set in various manners. For example, the predefined command may be a command for organizing objects in the specified region. For another example, the predefined command may be a command for prohibiting the electronic device 100 from accessing the specified region. For still another example, the predefined command may be a command for providing information of objects located in the specified region.

Through operations 301 to operations 317, the electronic device 100 may determine a specified region corresponding to the gesture indicated by a user, and may perform a predefined command on the determined specified region.

Figure 4:
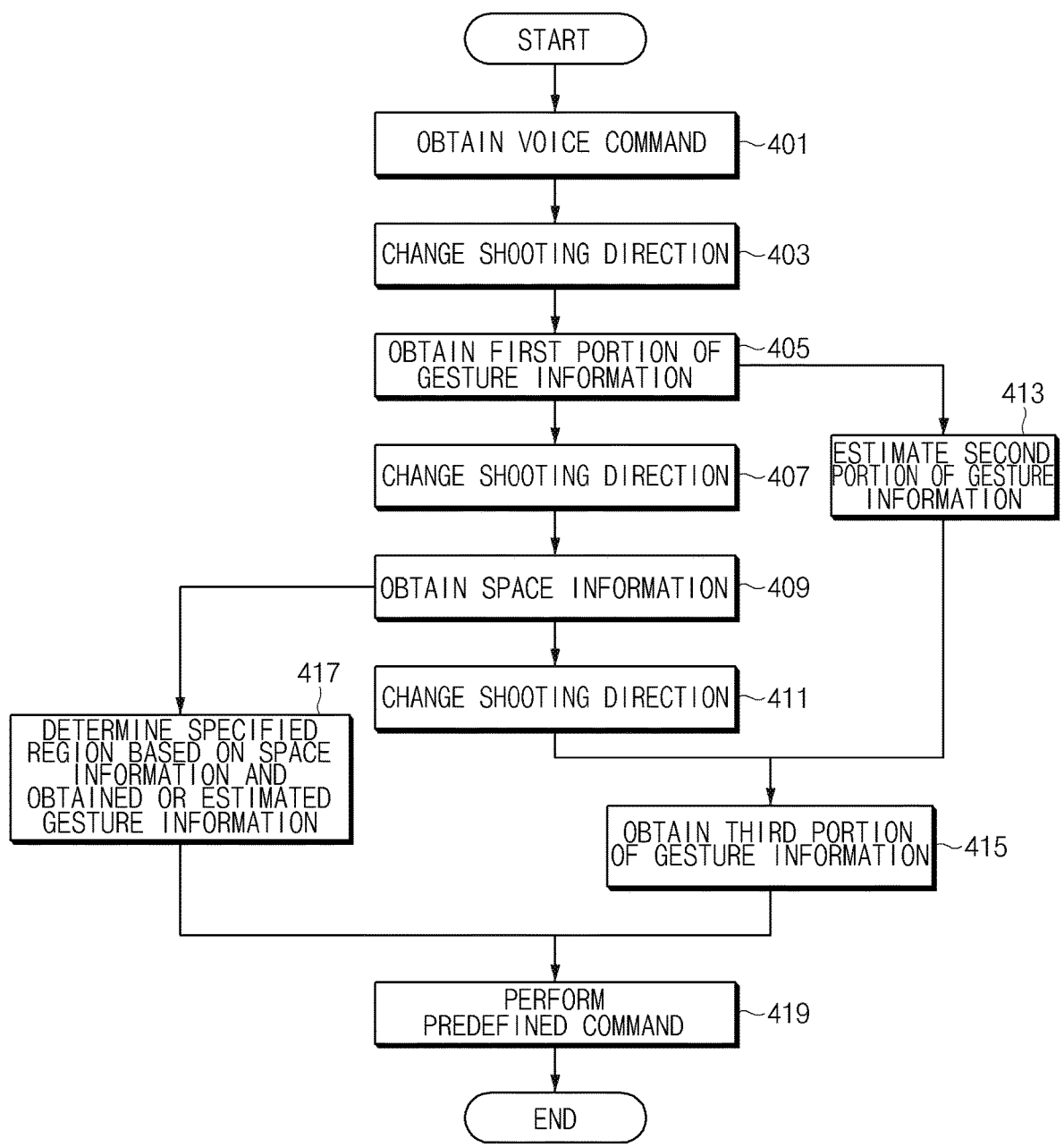
FIG. 4 is a flowchart, in which an electronic device recognizes a user's gesture and performs a predefined command, according to an embodiment.

FIG. 4 is a flowchart, in which an electronic device recognizes a user's gesture and performs a predefined command, according to an embodiment.

Referring to FIG. 4, an operation in which an electronic device (e.g., the electronic device 100 of FIGS. 1 and 2) according to an embodiment recognizes a gesture (e.g., the gesture 10a of FIG. 1) of a user (e.g., the user 1 of FIG. 1) and performs a predefined command may include operation 401 to operation 419. In FIG. 4, with regard to the description given with reference to FIG. 3, additional description will be omitted to avoid redundancy.

In operation 401 to operation 411, the electronic device 100 may perform the same operation as operation 301 to operation 311 illustrated in FIG. 3. For example, the electronic device 100 may obtain a user's voice command, may change the shooting direction, and may obtain gesture information at first and second time points, for example, first gesture information. The electronic device 100 may obtain space information by changing the shooting direction again, and then may change the shooting direction back to the user's direction.

In operation 413, the electronic device 100 may estimate the second portion of gesture information. The second portion may be referred to as second gesture information. In an embodiment, it may be understood that the second gesture information is a portion in which the electronic device 100 does not directly obtain a user's gesture, for example, gesture information about a user's gesture during a time period between the second time point and the third time point.

According to an embodiment, the electronic device 100 may estimate the second gesture information based on the first gesture information obtained in operation 405 and the elapsed time between the second time point and the third time point.

In operation 415, the electronic device 100 may obtain a third portion of gesture information. The third portion may be referred to as third gesture information. In an embodiment, the third gesture information may be gesture information about a user's gesture after the third time point. When the third gesture information is obtained, the electronic device 100 may obtain all of the gesture information as an input, including the first gesture information and the second gesture information.

In operation 417, the electronic device 100 may perform the same or similar operation to operation 313 illustrated in FIG. 3. For example, at the second time point when the space information is obtained in operation 409, the electronic device may obtain the first gesture information and may estimate some of the second gesture information. The electronic device 100 may determine a specified region (e.g., the specified region 10*b* in FIG. 1) at the second time point based on the space information and the obtained or estimated gesture information. For another example, after the second time point, the electronic device 100 may estimate the remaining parts of the second gesture information and may obtain the third gesture information. After the second time point, the electronic device may determine the specified region based on the space information and the obtained or estimated gesture information.

In operation 419, the electronic device 100 may perform the same operation as operation 317 illustrated in FIG. 3. For example, the electronic device may perform a predefined command based on the specified region determined in operation 417.

Through operations 401 to operations 419, the electronic device 100 may determine a specified region corresponding to the gesture indicated by a user, and may perform a predefined command on the determined specified region.

Figure 5:
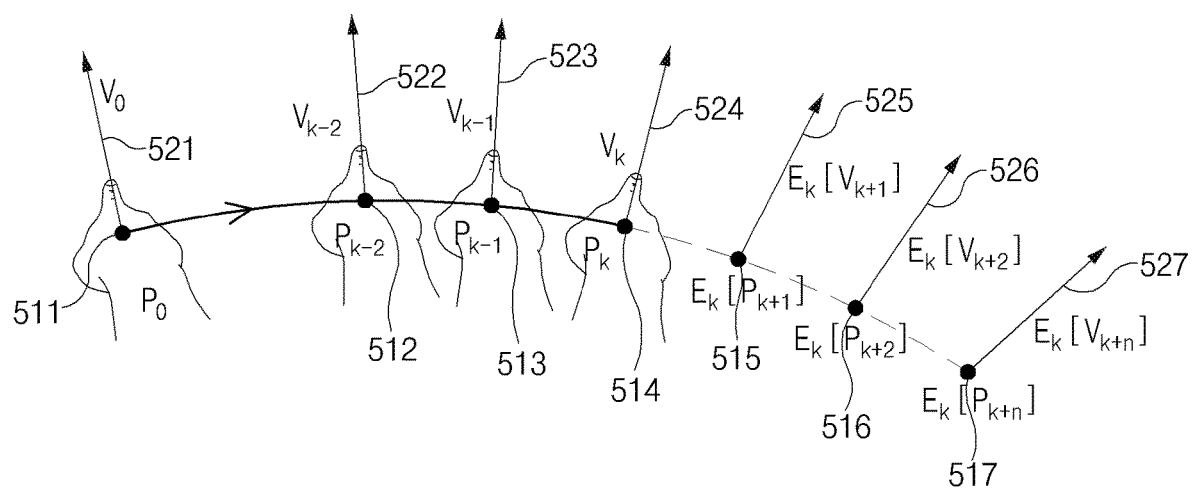
FIG. 5 illustrates a method in which an electronic device estimates a user's gesture, according to an embodiment.

FIG. 5 illustrates a method in which an electronic device estimates a user's gesture, according to an embodiment.

Referring to FIG. 5, gesture information about a gesture (e.g., the gesture 10*a* in FIG. 1) of a user (e.g., the user 1 in FIG. 1) which changes over time may be identified. According to an embodiment, an electronic device (e.g., the electronic device 100 of FIGS. 1 and 2) may obtain gesture information at a specified time interval from a first time point to a second time point. For example, the electronic device 100 may obtain gesture information at the first to k-th points 511 to 514 from the first time point to the second time point. In an embodiment, the gesture information may include coordinates (e.g., coordinates $P_0$ 511 at the first point) and direction vector (e.g., a first vector $V_0$ 521) of a user's body part.

According to an embodiment, the electronic device 100 may estimate gesture information after the second time point, based on the gesture information obtained from the first time point to the second time point. For example, the electronic device 100 may estimate gesture information at the (k+1)-th to (k+n)-th points 515 to 517 after the second time point, based on gesture information at the (k−2)-th to k-th points 512 to 514 obtained from the first time point to the second time point.

According to an embodiment, the coordinates of the position of a hand at point 't' may be represented by $P_t$; the amount of change in the coordinates may be represented by $\Delta_t = P_t - P_{t-1}$. According to an embodiment, the direction vector at point T may be represented by $V_t$; and the amount of change in the direction vector may be represented by $d_t = V_t - V_{t-1}$.

According to an embodiment, the gesture information may be estimated based on the gesture information obtained or estimated before the estimated time point. For example, the coordinates at the (k+1)-th point 515 may be estimated as $E[P_{k+1}] = P_k + (\Delta_k (\Delta_k - \Delta_{k-1}))$. The direction vector 525 at the (k+1)-th point 515 may be estimated as $$E[V_{k+1}] = \frac{V_k + (d_k + (d_k - d_{k-1}))}{|V_k + (d_k + (d_k - d_{k-1}))|}.$$

For another example, the coordinates at the (k+n)-th point 517 may be estimated as $E[P_{k+n}] = E[P_{k+n-1}] + (E[\Delta_{k+n-1}] + (E[\Delta_{k+n-1}] - E[\Delta_{k+n-2}]))$. The direction vector 527 at the (k+n)-th point 517 may be estimated as $$E[V_{k+n}] = \frac{V_{k+n-1} + (d_{k+n-1} + (d_{k+n-1} - d_{k+n-2}))}{|V_{k+n-1} + (d_{k+n-1} + (d_{k+n-1} - d_{k+n-2}))|}.$$

Through the process, the electronic device may sequentially estimate gesture information after the second time point.

Figure 6:
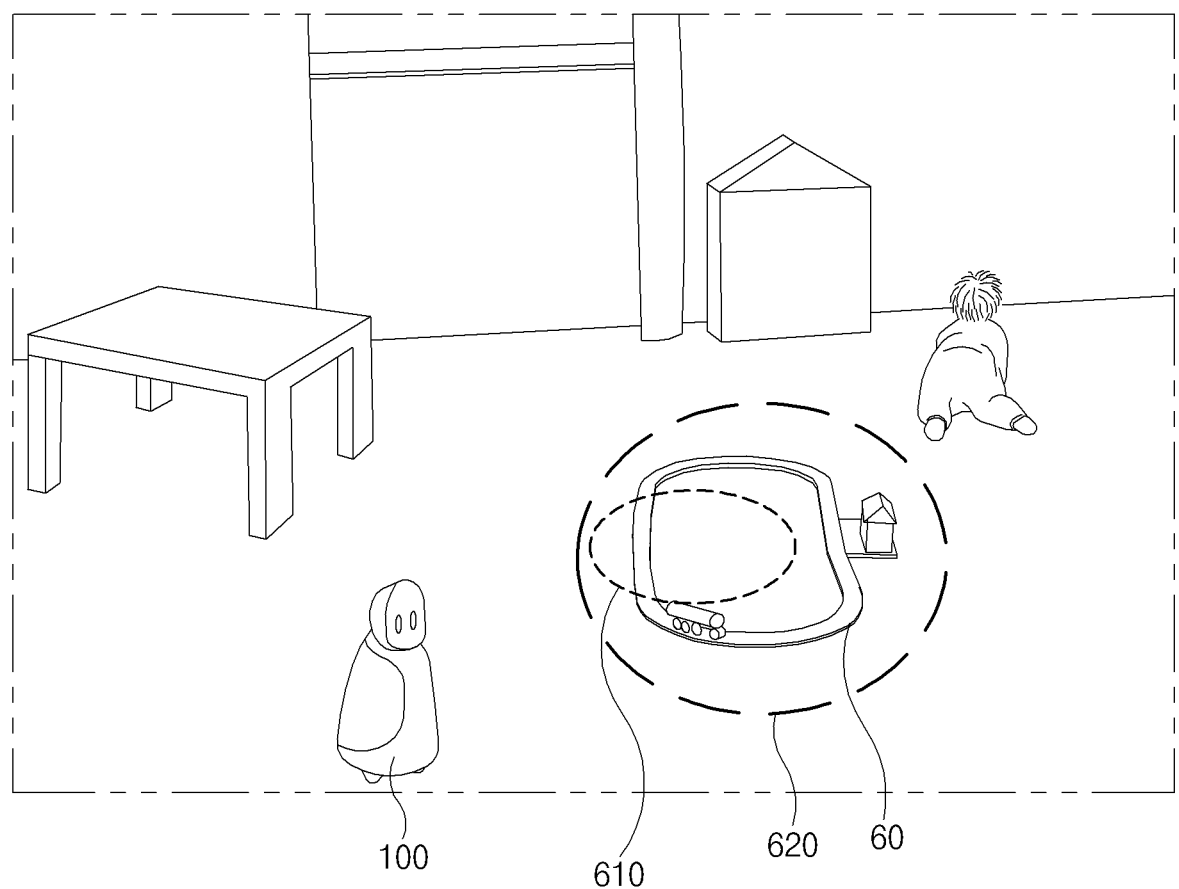
FIG. 6 illustrates an embodiment, in which an electronic device expands a specified region, according to an embodiment.

FIG. 6 illustrates an embodiment, in which an electronic device expands a specified region, according to an embodiment.

Referring to FIG. 6, the electronic device (e.g., the electronic device 100 of FIGS. 1 and 2) may obtain a voice command of a user (e.g., the user 1 of FIG. 1) and may determine a specified region in response to the acquisition of the voice command. For example, as illustrated in FIG. 6, the electronic device 100 may determine that a first region 610 is the specified region. For example, the specified region may be determined depending on the flowchart illustrated in FIG. 3 or 4.

According to an embodiment, the electronic device 100 may obtain information about objects included in the specified region. For example, the information about a object may include the size of the object, the distance to the object, and the color of the object. According to an embodiment, the electronic device 100 may determine whether the object is partially included in the specified region. For example, as illustrated in FIG. 6, it may be determined whether a whole first object 60 is included in the first region 610 or whether only the part of the first object 60 is included in the first region 610.

According to an embodiment, when the electronic device 100 recognizes the first object 60 that is only partially included in the first region 610, the electronic device 100 may expand the determined specified region from the first region 610 to a second region 620 including the whole first object 60. Even though the region actually specified by user is the first region 610, the electronic device 100 may recognize that the specified region is the second region 620 and may perform a predefined command.

For example, the user may indicate the first region 610 while instructing the electronic device 100 to prohibit the access to the first object 60 illustrated in FIG. 6. In this case, the first region 610 actually indicated by the user includes only a part of the first object 60. However, the electronic device 100 may determine that the specified region indicated by the user is the second region 620 and may perform an access prohibition command on the whole first object 60.

Figure 7A:
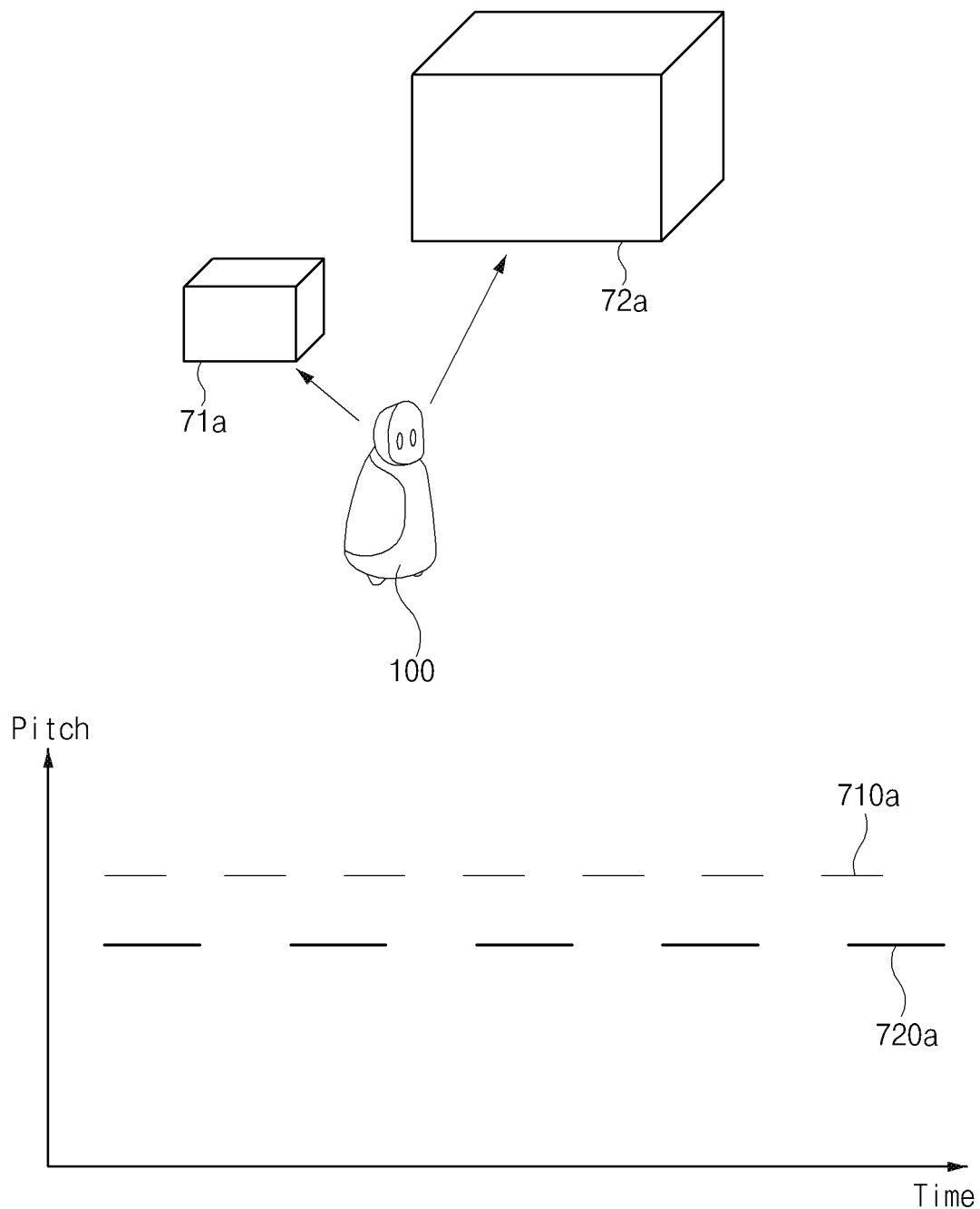
FIG. 7A illustrates a method, in which an electronic device provides a specified voice feedback based on a recognized object, according to an embodiment.

FIG. 7A illustrates a method, in which an electronic device provides a specified voice feedback based on a recognized object, according to an embodiment.

Referring to FIG. 7A, the electronic device 100 may provide different feedback sound sources depending on a object disposed at the location indicated by a user. For example, the electronic device 100 may provide different sound sources depending on a first target 71*a* and a second target 72*a*. The first graph 710*a* illustrated in FIG. 7A may represent a feedback sound source for the first target 71*a*; the second graph 720a may represent a feedback sound source for the second target 72a. To provide the feedback sound source, the electronic device 100 may include a speaker.

According to an embodiment, the electronic device 100 may obtain information about a target indicated by the user in real time depending on a gesture operation of the user. In an embodiment, when the electronic device 100 obtains a part of gesture information, for example, first gesture information, and then obtains space information, the electronic device 100 may obtain information about a target indicated by the user, based on the obtained gesture information and the obtained space information. In another embodiment, when the electronic device 100 estimates a part of the gesture information, for example, second gesture information estimated from the first gesture information, after obtaining the space information, the electronic device 100 may obtain information about a target indicated by the user, based on at least part of the space information and the estimated gesture information.

According to an embodiment, the electronic device 100 may provide a specified sound source to the user based on the obtained information. For example, the electronic device 100 may differently adjust the pitch or period of a specified sound source based on the obtained information. The electronic device 100 may provide the user with information about a target recognized by the electronic device 100 in real time by playing the adjusted sound source. According to an embodiment, the information about the target may include at least one of the distance to the target, the size of the target, and the boundary of the target.

According to an embodiment, the electronic device 100 may adjust the pitch of a sound source based on the size of the target indicated by the user. For example, when the size of the target is relatively large, the electronic device 100 may play the sound source having a relatively high sound. For another example, when the size of the target is relatively small, the electronic device 100 may play the sound source having a relatively low sound.

According to an embodiment, the electronic device 100 may adjust the period of the sound source based on the distance to the target indicated by the user. For example, when the distance to the target is relatively long, the electronic device 100 may play the sound source having a relatively long period. For another example, when the distance to the target is relatively short, the electronic device 100 may play the sound source having a relatively short period.

According to an embodiment, because the size of the first target 71a is relatively small and the distance from the electronic device 100 is relatively short, as illustrated in the first graph 710a, the sound source having a high pitch may be played at a short period.

According to an embodiment, because the size of the second target 72a is relatively large and the distance from the electronic device 100 is relatively long, as illustrated in the second graph 720a, the sound source having a low pitch may be played at a long period.

In this way, the electronic device 100 may provide the user with information about the target recognized by the electronic device 100; the user may determine whether the target recognized by the electronic device 100 is the same as the target intended by the user.

Figure 7B:
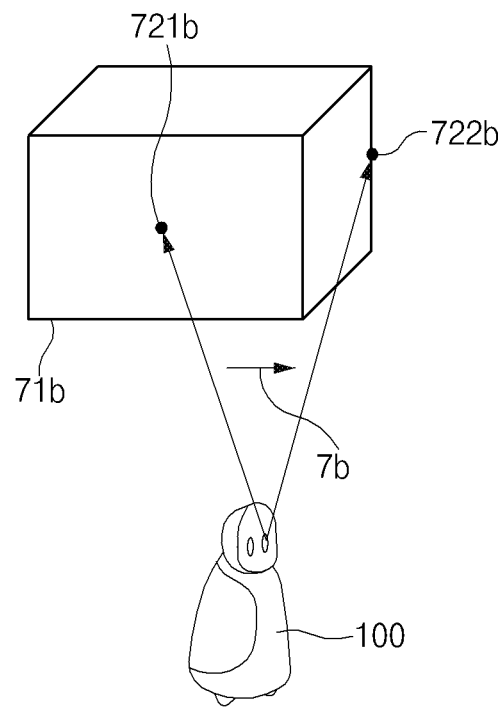
FIG. 7B illustrates a method, in which an electronic device provides a specified voice feedback with respect to a boundary of a recognized object, according to an embodiment.
Figure 7B:
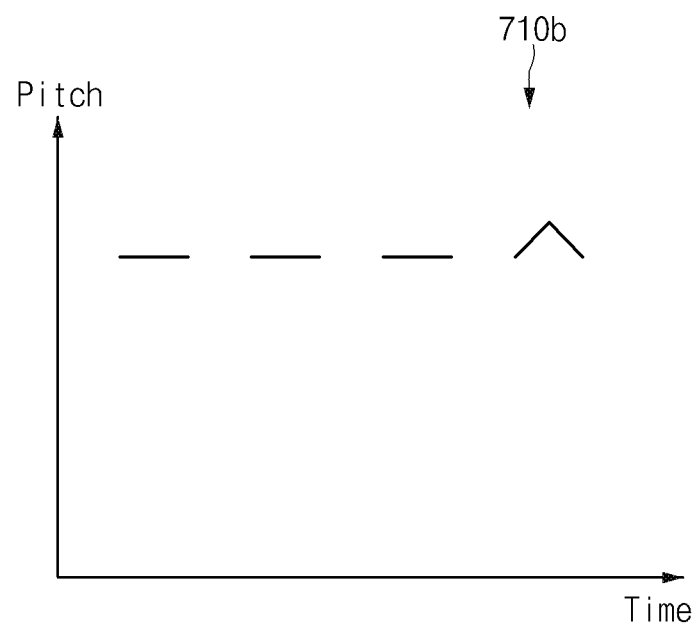

FIG. 7B illustrates a method, in which an electronic device provides a specified voice feedback with respect to a boundary of a recognized object, according to an embodiment.

Referring to FIG. 7B, the electronic device 100 may provide a feedback sound source as the point indicated by a user is moved. The point indicated by the user may be moved from a first point 721b to a second point 722b in a first direction 7b with respect to a first target 71b. A first graph 710b may represent the feedback sound source played as the point indicated by the user is moved as described above.

According to an embodiment, when the boundary of the first target 71b indicated by the user is reached, the electronic device 100 may play a specified sound source in a specified manner such that the user may recognize the boundary of the first target 71b. As illustrated in the first graph 710b, for example, the electronic device 100 may change the pitch of the sound as soon as the boundary of the target indicated by the user is reached.

Referring to the first graph 710b, as the point indicated by the user is moved from the first point 721b in the first direction 7b, the electronic device 100 may provide a constant feedback sound source; when the point indicated by the user reaches the second point 722b, the electronic device 100 may provide the feedback sound source whose pitch is changed.

In this way, the electronic device 100 may provide the user with information about the target recognized by the electronic device 100; the user may determine whether the target recognized by the electronic device 100 is the same as the target intended by the user.

Figure 7C:
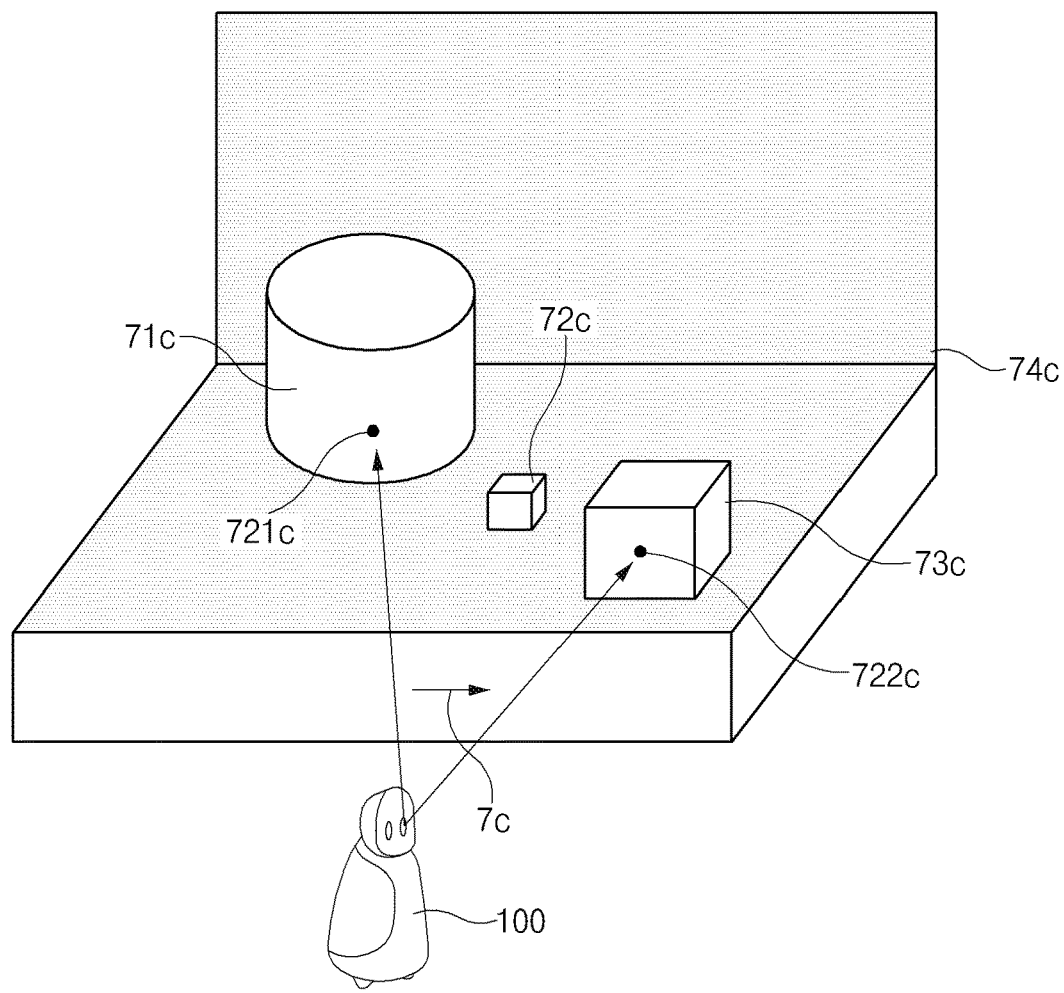
FIG. 7C illustrates a method, in which an electronic device recognizes a plurality of objects and provides specified voice feedbacks, according to an embodiment.
Figure 7C:
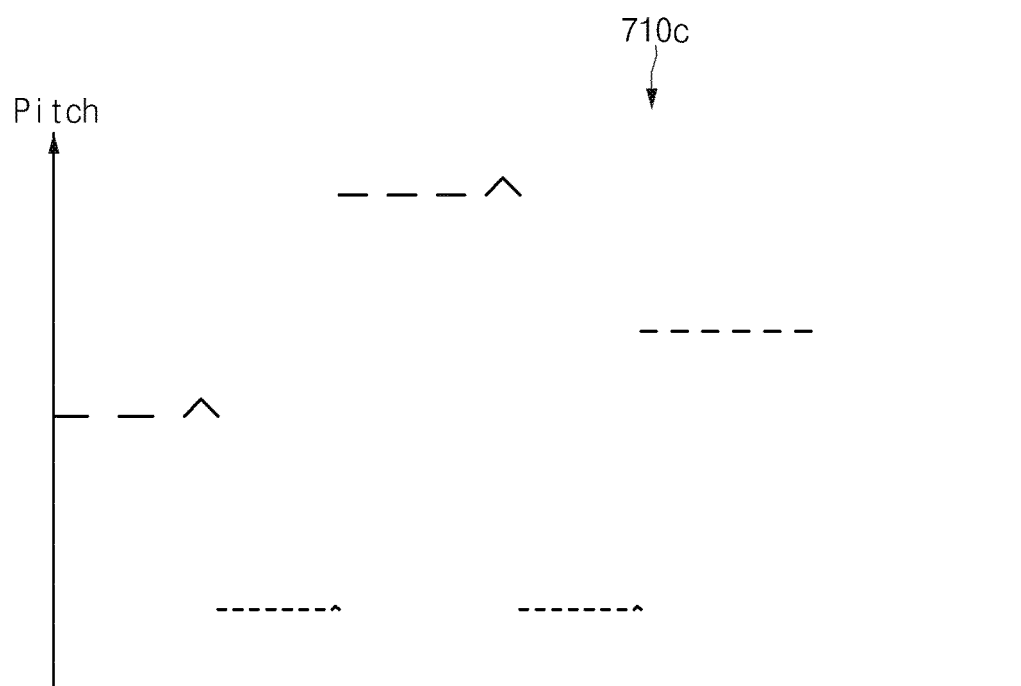

FIG. 7C illustrates a method, in which an electronic device recognizes a plurality of objects and provides specified voice feedbacks, according to an embodiment.

Referring to FIG. 7C, when the point indicated by a user is moved from a first point 721c to a second point 722c in a first direction 7c, the electronic device 100 may provide a user with a specified feedback sound source. According to an embodiment, the point indicated by the user may be moved from the first point 721c to the second point 722c in the first direction 7c. As described above, the first graph 710c may represent a feedback sound source played by the electronic device 100 when the point indicated by the user is moved.

According to an embodiment, the point indicated by the user may be moved in the order of a first target 71c, a background 74c, a second target 72c, the background 74c, and a third target 73c. Referring to the first graph 710c, it may be seen that the pitch or period to be played is different depending on the size or distance of each target; it may be seen that the pitch is changed at the boundary of each target.

According to an embodiment, as illustrated in FIG. 7C, as the point indicated by the user is changed, the electronic device 100 may play feedback sound sources having different characteristics. In this way, the electronic device 100 may provide the user with information about the currently-recognized point in real time; the user may determine whether the electronic device 100 recognizes the currently-recognized point, which the actual user intends, through the provided information.

Figure 8:
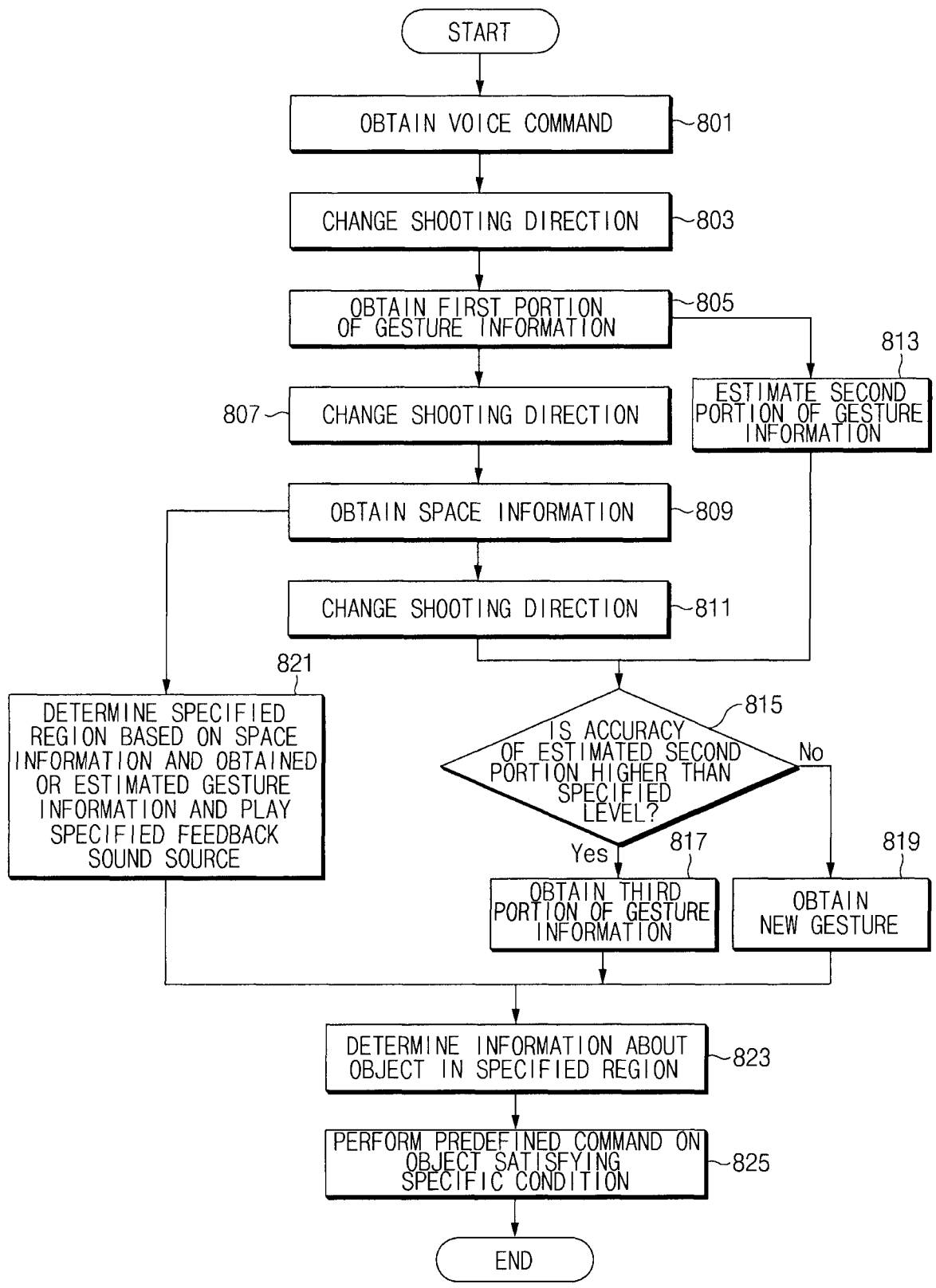
FIG. 8 is a flowchart, in which an electronic device recognizes a user's gesture and performs a predefined command, according to an embodiment.

FIG. 8 is a flowchart, in which an electronic device recognizes a user's gesture and performs a predefined command, according to an embodiment.

Referring to FIG. 8, an operation in which an electronic device (e.g., the electronic device 100 of FIGS. 1 and 2) according to an embodiment recognizes a gesture (e.g., the gesture 10a of FIG. 1) of a user (e.g., the user 1 of FIG. 1) and performs a predefined command may include operation 801 to operation 825. In FIG. 8, with regard to the description given with reference to FIG. 4, additional description will be omitted to avoid redundancy.

According to an embodiment, in operation 801 to operation 813 illustrated in FIG. 8, the electronic device 100 may perform the same operation as operation 401 to operation 413 illustrated in FIG. 4. For example, the electronic device 100 may obtain a user's voice command, may change the shooting direction, and may obtain gesture information at first and second time points, for example, first gesture information. The electronic device 100 may obtain space information by changing the shooting direction again, and then may change the shooting direction back to the user's direction. The electronic device 100 may estimate gesture information from a second time point to a third time point, which does not face the user, for example, second gesture information based on first gesture information and an elapsed time between the second time point and a third time point.

In operation 815, the electronic device 100 may evaluate the accuracy of second gesture information estimated in the operation 813. For example, in operation 813, the electronic device 100 may estimate gesture information during a time period between the second time point and the third time point. At the third time point, because the electronic device 100 is facing the user, the electronic device 100 may obtain gesture information at the third time point from the camera module (e.g., the camera module 120 of FIG. 2). The electronic device 100 may compare the obtained gesture information at the third time point with the estimated gesture information at the third time point; in this way, the electronic device 100 may calculate the accuracy of the second gesture information.

In an embodiment, when the calculated accuracy is higher than a specified level, the electronic device 100 may perform operation 817. When the calculated accuracy is lower than the specified level, the electronic device 100 may perform operation 819.

In operation 817, the electronic device 100 may trust the second gesture information estimated in operation 813, and thus may obtain third gesture information. In this way, the electronic device may obtain or estimate all pieces of gesture information about the user's gesture including the first gesture information, the second gesture information, and the third gesture information.

In operation 819, the electronic device 100 may not trust the second gesture information estimated in operation 813, and thus may obtain new gesture information from the user. For example, the electronic device 100 may delete gesture information entered before the third time point and newly obtain gesture information after the third time point. For another example, the electronic device 100 may play a specified sound source to allow the user to make a request for a new gesture at the third time point. In this way, the electronic device may obtain all pieces of gesture information about the user's gesture.

In operation 821, the electronic device 100 may determine a specified region (e.g., the specified region 10b of FIG. 1) indicated by the user based on space information and gesture information and may play a specified feedback sound source. In an embodiment, the gesture information may be gesture information being obtained or estimated. For example, the gesture information may include the second gesture information estimated in operation 813 and may include gesture information newly obtained in operation 819. In an embodiment, an operation of determining the specified region and playing the specified feedback sound source may be performed in real time as the point indicated by the user is moved.

In operation 823, the electronic device 100 may determine information about a object positioned in the specified region. For example, the electronic device 100 may determine whether all objects are included in the specified region or whether only a part of objects is included in the specified region. For another example, the electronic device may determine the size, type, or the like of a object included in the specified region.

In operation 825, the electronic device 100 may perform a predefined command based on information about the object determined in operation 823. For example, the electronic device 100 may perform a command to prohibit the access to the object included in the specified region. For another example, the electronic device 100 may perform a command for organizing objects included in the specified region. In this case, the electronic device 100 may perform an operation on a object, of which the size is smaller than a specified size, based on information about the object determined in operation 823.

Through operations 801 to operations 825, the electronic device 100 may determine a specified region corresponding to the gesture indicated by a user in real time, and may provide the user with the feedback on the specified region in real time. The electronic device may perform a predefined command on the determined specified region.

Figure 9:
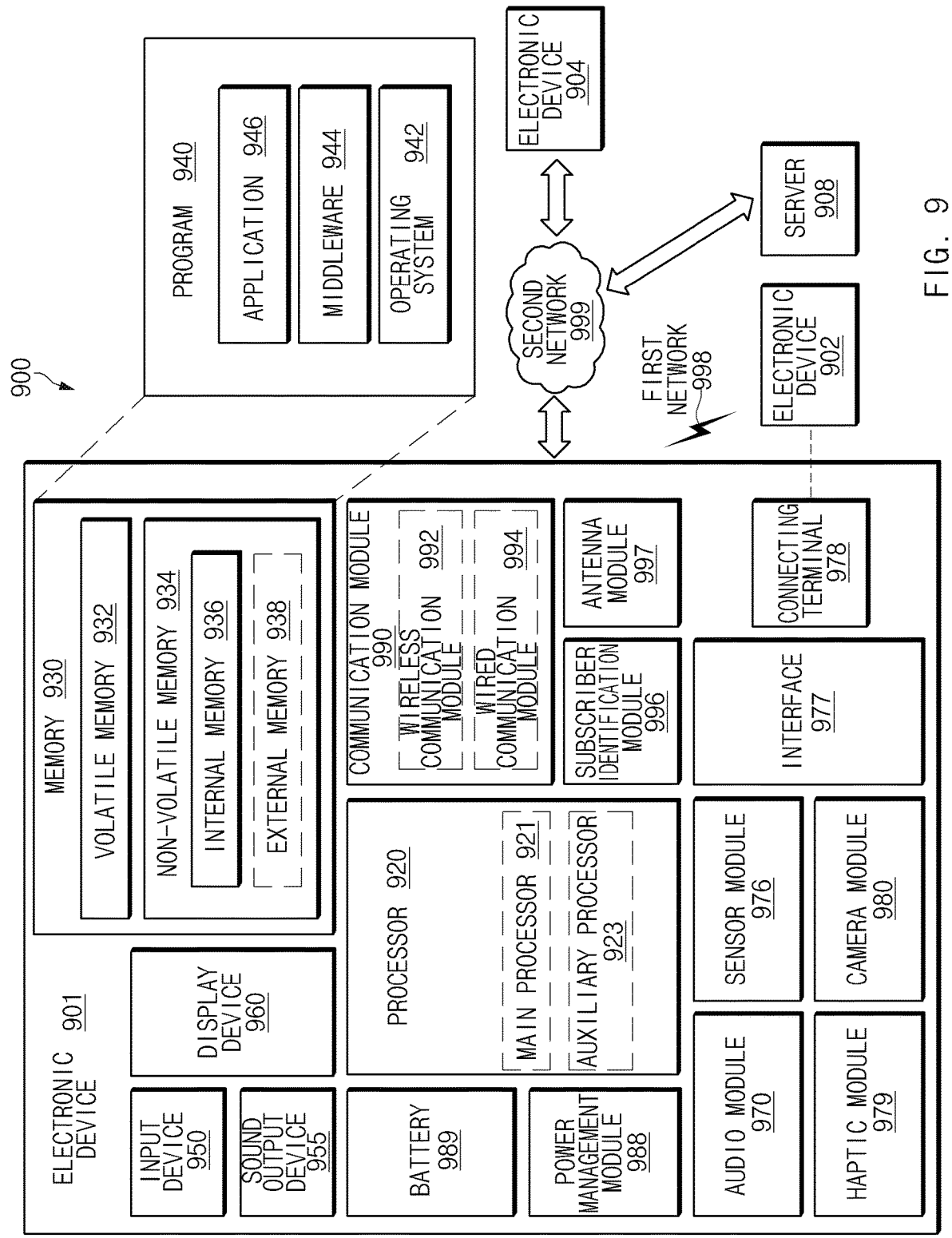
FIG. 9 is a block diagram of an electronic device recognizing a gesture in a network environment, according to various embodiments.

FIG. 9 is a block diagram of an electronic device in a network environment according to various embodiments.

Referring to FIG. 9, an electronic device 901 may communicate with an electronic device 902 through a first network 998 (e.g., a short-range wireless communication) or may communicate with an electronic device 904 or a server 908 through a second network 999 (e.g., a long-distance wireless communication) in a network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 990), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user of the electronic device 901 and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

According to embodiments disclosed in this specification, even when a user points to a region out of the FoV of an electronic device, an electronic device may recognize the indicated region in response to the operation indicated by the user directly. Besides, it is possible to allow the electronic device to increase the accuracy of recognition for the user's command, by providing the user with information about a specified region corresponding to the user's gesture in real time. In this way, the user's convenience may be increased.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 940) including an instruction stored in a machine-readable storage media (e.g., an internal memory 936 or an external memory 938) readable by a machine (e.g., a computer). The machine may be a device that calls the instruction from the machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a sensor;
a camera circuit having a field of view (FoV) in a specified range;
an actuator configured to change a shooting direction of the camera circuit; and
a processor electrically connected to the sensor, the camera circuit, and the actuator,
wherein the processor is configured to:
obtain a command from a user, using the at least one sensor;
in response to obtaining the command, change the shooting direction of the camera circuit by controlling the actuator for the user to be included in the FoV of the camera circuit;
obtain gesture information about a moving gesture of the user as an input through the camera circuit, while obtaining the gesture information:
obtain first gesture information of the gesture information from the camera circuit, from a first time point to a second time point;
control the actuator to change the FoV based on a direction determined by the obtained first gesture information, at the second time point;
obtain space information corresponding to the changed FOV through the camera circuit;
control the actuator for the user to be included in the FoV of the camera circuit, at a third time point, the third time point being after the second time point; and
after the third time point, obtain second gesture information of the gesture information from the camera circuit; and
perform the command based on a specified region determined by the obtained space information and the obtained gesture information when all the gesture information is obtained as an input.

2. The electronic device of claim 1, wherein the processor is further configured to estimate third gesture information among the gesture information corresponding to the gesture from the second time point to the third time point, based on the first gesture information and the second gesture information.

3. The electronic device of claim 1, wherein the processor is further configured to estimate third gesture information among the gesture information corresponding to the gesture from the second time point to the third time point, based on an elapsed time between the second time point and the third time point and the first gesture information.

4. The electronic device of claim 2, wherein the processor is further configured to measure an accuracy of the estimated third gesture information at the third time point, based on the second gesture information.

5. The electronic device of claim 4,
wherein the processor is further configured to obtain new gesture information as an input from the user when the measured accuracy is less than a specified level and perform the command based on the obtained space information and the obtained new gesture information.

6. The electronic device of claim 1, wherein the gesture information includes coordinates for a specified body part of the user and a direction vector of the gesture.

7. The electronic device of claim 1, wherein the processor is further configured to obtain the gesture information at a specified time interval.

8. The electronic device of claim 1, wherein, when recognizing only a part of a object included in the determined specified region, the processor is further configured to expand the determined specified region to a region including the whole object.

9. The electronic device of claim 1, wherein, when obtaining the space information, the processor is further configured to obtain information about a target indicated by the user through the gesture, based on at least part of the obtained space information and the obtained or estimated gesture information.

10. The electronic device of claim 1, further comprising:
a speaker,
wherein, when obtaining information of the indicated target, the processor is further configured to control the speaker to play a specified sound source based on the information of the indicated target.

11. The electronic device of claim 1, wherein the information of the indicated target includes at least one of a distance of a target, a size of a target, or a boundary of a target.

12. The electronic device of claim 1, wherein the processor is further configured to obtain information about at least one object included in the specified region and performs the command based on the obtained information.

13. The electronic device of claim 12, wherein the information about the at least one object includes a size of the object, and
wherein the processor is further configured to perform the command on object, which is smaller than a specified size, from among the at least one object based on the obtained information.

14. The electronic device of claim 1, wherein the processor is further configured to
when a specified voice is included in the command, in response to obtaining the command, change the shooting direction of the camera circuit by controlling the actuator for the user to be included in the FoV of the camera circuit.

15. A gesture-based command performing method of an electronic device, the method comprising:
obtaining a command from a user, using a sensor;
in response to obtaining the command, changing the shooting direction of the camera circuit by controlling the actuator for the user to be included in the FoV of the camera circuit;
obtaining first gesture information about a moving gesture of the user through the camera circuit, from a first time point to a second time point;
controlling the actuator to change the FoV based on a direction determined by the first gesture information, at the second time point;
obtaining space information corresponding to the changed FOV through the camera circuit;
controlling the actuator for the user to be included in the FoV of the camera circuit, at a third time point, the third time point being after the second time point;
after the third time point, obtaining second gesture information about the moving gesture of the user through the camera circuit; and
performing the command based on a specified region determined by the obtained space information and the obtained gesture information when all the gesture information is obtained as an input.

\* \* \* \* \*